(12) United States Patent
Wald et al.

(10) Patent No.: US 8,041,018 B2
(45) Date of Patent: Oct. 18, 2011

(54) SYSTEM AND METHOD FOR ESTABLISHING A CONFERENCE IN TWO OR MORE DIFFERENT LANGUAGES

(76) Inventors: Samuel Joseph Wald, Brookline, MA (US); Israel Mayer Stein, Chestnut Hill, MA (US)

( * ) Notice: Subject to any disclaimer, the term of this patent is extended or adjusted under 35 U.S.C. 154(b) by 0 days.

(21) Appl. No.: 12/451,538

(22) PCT Filed: Dec. 3, 2008

(86) PCT No.: PCT/US2008/013339
§ 371 (c)(1),
(2), (4) Date: Nov. 16, 2009

(87) PCT Pub. No.: WO2009/073194
PCT Pub. Date: Jun. 11, 2009

(65) Prior Publication Data
US 2010/0135478 A1 Jun. 3, 2010

Related U.S. Application Data

(60) Provisional application No. 61/005,164, filed on Dec. 3, 2007.

(51) Int. Cl.
*H04M 3/56* (2006.01)
*G06F 17/28* (2006.01)
(52) U.S. Cl. ............ 379/202.01; 370/260; 704/2; 704/8
(58) Field of Classification Search .......... 370/260–262; 379/202.01–206.01; 704/8, 2, 3, 7
See application file for complete search history.

(56) References Cited

U.S. PATENT DOCUMENTS

| 5,392,343 | A | 2/1995 | Davitt et al. |
| 5,426,706 | A | 6/1995 | Wood |
| 7,072,941 | B2 | 7/2006 | Griffin et al. |

(Continued)

FOREIGN PATENT DOCUMENTS

JP 2002342326 11/2002

(Continued)

OTHER PUBLICATIONS

Webpage, Synonyme, New Simultaneous Interpreting on Conference Call, Printed Apr. 1, 2009, webpage at http://synonyme.net/en/menu2.htm.

(Continued)

*Primary Examiner* — Harry Hong
(74) *Attorney, Agent, or Firm* — Kenneth J. Lukacher

(57) ABSTRACT

System and method for conferencing communication devices associated with participants conversant in different languages has a system for connecting communication devices with one or more other communication devices where each communication device is associated with one of a plurality of different languages, and one of the different languages is designated as the main language. The system in response to receiving a request for a conference call, connects two or more of the communication devices in a conference call when two or more of said communication devices are associated with the main language, connects each of the communication devices associated with a different language than the main language with the communication device of an interpreter selected for interpreting between the different language and the main language, and then connects the communication device of the interpreter for each of the different languages than the main language to the conference call.

30 Claims, 5 Drawing Sheets

U.S. PATENT DOCUMENTS

| | | | |
|---|---|---|---|
| 7,117,223 | B2 | 10/2006 | Koizumi et al. |
| 7,792,276 | B2 * | 9/2010 | Moore et al. .............. 379/265.12 |
| 2002/0152063 | A1 | 10/2002 | Tokieda et al. |
| 2002/0193983 | A1 | 12/2002 | Tokieda et al. |
| 2004/0014462 | A1 | 1/2004 | Surette |
| 2005/0152530 | A1 | 7/2005 | Pence et al. |
| 2005/0272414 | A1 | 12/2005 | Vallarino |
| 2006/0095249 | A1 | 5/2006 | Kong et al. |
| 2006/0126821 | A1 | 6/2006 | Sahashi |
| 2006/0259307 | A1 | 11/2006 | Sanders et al. |
| 2007/0005339 | A1 | 1/2007 | Jaquinta |
| 2007/0050306 | A1 | 3/2007 | McQueen |
| 2007/0064916 | A1 | 3/2007 | Moore, Jr. et al. |
| 2009/0125295 | A1 * | 5/2009 | Drewes .............................. 704/3 |
| 2009/0187400 | A1 * | 7/2009 | Liu et al. ........................... 704/8 |

FOREIGN PATENT DOCUMENTS

| | | |
|---|---|---|
| JP | 2003110702 | 4/2003 |
| KR | 20020045356 | 6/2002 |

OTHER PUBLICATIONS

Webpage, Synonyme, Multilingual Conferencing, Printed Apr. 1, 2009, webpage at http://synonyme.net/web_animacion.html.

Webpage, CYRACOM Transparent Language Services, Over-the-Phone Interpretation, Printed Jun. 11, 2008, webpage at http://www.cyracom.net/Default.aspx?PageId=809.

Estonian Reference: ESTRS100504, Technology Profile, Mobile Interpretation Method, Dated May 28, 2004.

* cited by examiner

SYSTEM AND METHOD FOR ESTABLISHING A CONFERENCE IN TWO OR MORE DIFFERENT LANGUAGES

This application claims the priority benefit of U.S. Provisional Application No. 61/005,164, filed 3 Dec. 2007.

FIELD OF THE INVENTION

The present invention relates to a system and method (and software) for interpreter selection and connection to communication devices, and relates particularly to a system having a computer system for selecting the proper interpreter for interpretation of the language of a user of a communication device, such as a cellular telephone, for a multi-party (conference) call having participants conversant in two or more different languages. The system is useful for enabling multiple participants in a conference call who speak different languages to be connected, via their devices enabling cellular, land, VoIP, or other means for voice communication, to one or more interpreters that are selected and connected in the conference call where the presence of such one or more interpreters does not distract the participants in the call. Selection of the one or more interpreters needed for the conference call is preferably automatic, but such selected by manually provided by a human conference administrator prior to the start of a requested conference call.

BACKGROUND OF THE INVENTION

To provide communication with callers who speak different languages requires a caller to identify his or her language typically by a telephone response system which prompts the caller to identify the desired language by voice or tone (key selection) such that they can be connected to an interpreter or agent who can then process the caller's request. However, these telephone response systems become both complex and cumbersome to callers when interpretation is required in each one of multiple different languages which may have different regional forms thereof in conference calls having multiple parties speaking multiple different languages. The presence of multiple parties speaking different languages in the same conference call with such interpreter(s) to enable the parties to understand each other often makes the conference difficult since parties (and also their respective interpreter) can speak over each other in different languages resulting in confusion and even misunderstandings among such parties. Thus improved ways are needed to interconnect parties in a conference call between callers conversant in different languages and their respective interpreter(s). Moreover, interpreter(s) in conference calls, i.e., calls with more than two participants, while interpreting for participants often are distracting to other participants of the conference call who do not need such interpretation (i.e., oral translation). Such distraction may also occur in other types of conferencing situations having remotely-based interpreters. Thus, it would also be desirable that the interpreter(s) are connected in the conference in a manner that minimizes such possible distraction.

SUMMARY OF THE INVENTION

Accordingly, one feature of the present invention is to provide an improved system and method for establishing a conference call in two or more different languages using one or more interpreters selected in accordance with such different languages of the participants to the conference call.

A further feature of the present invention is to provide a system for establishing a conference call in two or more difference languages with two or more participants without distraction of conference call participants by the presence of one or more interpreters.

A still further feature of the present invention is to provide optional text translation among participants in a conference call among two or more participants speaking different languages in which either before, or during a conference call, text may be translated and provides to participants either in written form or orally.

Another feature of the present invention is to provide during a conference call in two or more difference languages with two or more participants optional conversion of speech between two of the different languages into translated text for participants.

Briefly described, the present invention embodies a system having a computer system with one or more interfaces enabling communication with one or more communication devices, and connecting two or more of the communication devices for voice communication. The computer system in response to a request for establishing a conference of a plurality of participants conversant in two or more different languages, in which each of the plurality of participants has a communication device for connection to the computer system, the computer system provides a two-way connection for enabling conference with each other of one or more of the participants conversant in a main language. For each of the one or more participants conversant in a different language than the main language, the computer system provides a two way connection with a communication device of the participant with a communication device of an interpreter selected for interpreting between one of the pairs of the different language and the main language, and then provides a two-way connection between the communication device of the selected interpreter and the conference.

The interpreter selected for interpreting between one of the pairs of the different language and the main language may be performed automatically by the computer in accordance with the stored information memory of the computer system which associates interpreters with pairs of different languages each of the interpreters are capable of interpreting between. Alternatively, the interpreter selection for interpreting between one of the pairs of the different language and the main language may be determined manually by a conference administrator.

The term participant represents an individual or a group of individuals which may be present at the same location, such as a room, and conversant in the same language.

Preferably to avoid distraction among participants in the conference call, the communication device of each participant requiring oral translation has a one-way receive only connection with the conference call in the main language at a volume level adjustable at the communication device by the participant. Thus, the participants conversant in the main language hear other participant conversant in the main language and the interpreter in the main language interpreting for each one the participant conversant in a different language than the main language, rather than the participant speaking the different language. Optionally, the communication device of each of said participants requiring oral translation is selectable by the participant between a one-way receive only connection or a two-way connection with the conference call in the main language.

The communication device may be a cellular or wireless based communication device such as a cellular telephone, PDA, or a personal computer, laptop, or other microprocessor based system capable of connecting to the computer system.

Preferably, the communication device is a microprocessor-based system operative to provide two-way voice communication and has a display identifying each of the participants and when each one of said participants is speaking. Such display may be a visual display on the screen on the computer system or an external display connected to a microprocessor-based system or the computer system. Further such microprocessor based system may have an interface, such as a touch screen, keys, or toggle enabling one of the participants to notify other participants of an intention to speak in the conference. The communication device may also be a typical land-based telephone, or headset, but such is less preferable since a visual display may not be available. When an external video display is present, it is thus separate from the audio connection via the communication device to either an interpreter or to the conference being carried out in the main language.

The system may further be used in conference call, or in a conference in an auditorium, lecture hall, or the like, using one or more remotely-based interpreters, where each attendee conversant in the non-main language of the conference has a communication device automatically connected by the computer system with an interpreter selected from the interpreter database for interpreting between the attendee's non-main language and the main language openly spoken in the conference, where the interpreter has a communication device in two-way connection with another communication device resident in the conference for conversing in the main language.

The computer system may further enable enabling automatic or human interpretation (i.e., via interpreter) of text between any two of the different languages into translated text or speech at the start of or during the conference to one or more of the communication devices. Such text may represent a digital document provided to the computer system prior to or during a conference, or text from one or more sources, such as to an on-line chat room (e.g., instant messaging), message boards, conference voting, notes, or the like. Also, automatic or human interpretation may convert speech between two of the different languages into translated text during the conference to one or more of the communication devices. Translated text may appear on the visual display or an external display of the communication device(s).

The present invention also embodies a method for establishing a conference via communication devices associated with participants conversant in different languages comprising the steps of establishing a main language circle having communication device(s) all associated with the same one of the different languages, connecting each of the communication device(s) associated with a different language other than the main language via a communication device of an interpreter, and then connecting in a conference such communication device(s) in the main language circle and the communication device of the interpreter connected to each of the communication device(s) associated with a different language other than the main language.

The method may further provide interpretation of text between any two different languages into translated text or speech at the start of or during the conference to one or more of the communication device, or interpretation of speech between any two different languages into translated text during the conference to one or more of the communication device.

BRIEF DESCRIPTION OF THE DRAWINGS

The foregoing and other features and advantages of the invention will become more apparent from a reading of the following detailed description in connection with the accompanying drawings, in which.

DETAILED DESCRIPTION OF THE INVENTION

Figure 1:
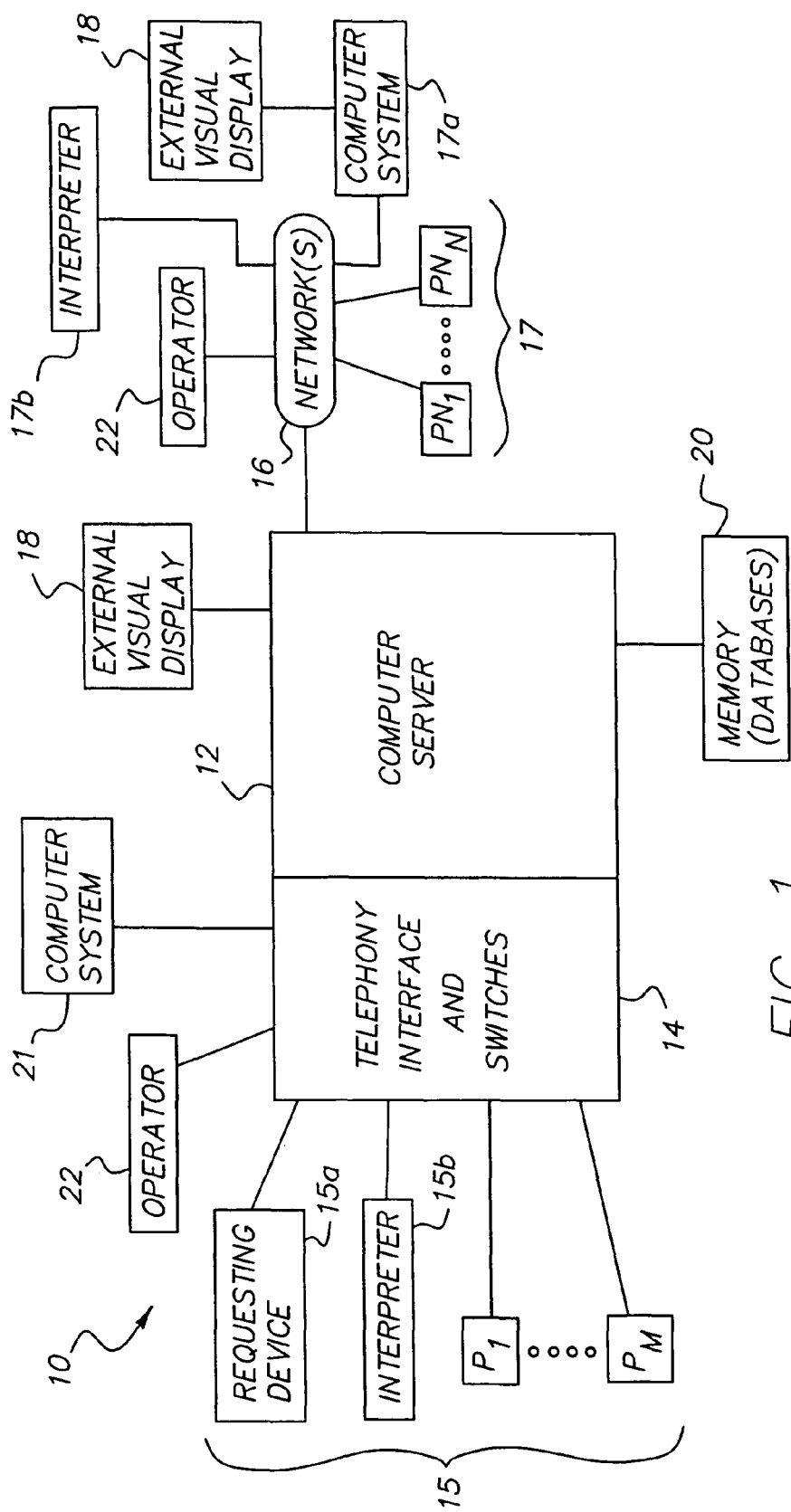
FIG. 1 is a block diagram of the system of the present invention.

Referring to FIG. 1, the system 10 has a computer system 12 which may be a computer server, a telephony interface 14 having logic and switches for connecting to the one or more communication devices 15 to computer system 12 in response to such communication devices calling one or more telephone numbers assigned to system 10, making out bound calls at phone numbers assigned to one or more communication device 15, and also to enable the computer system to connect (or bridge) one or more of such communication devices 15 with each other (or with network 16 based communication devices 17) in two or more multi-party calls. The interface 14 may also enable the computer system 12 to receive text messages from and send text messages to those communication devices 15 that have text messaging capability. The computer system 12 also has network interfaces for communication over one or more networks 16, such as a LAN, WAN, or Internet (preferably including at least the Internet), with network based communication devices 17, such as by Voice Over IP (VoIP) software, or computer systems (or other microprocessor based systems or devices) 17a capable of connection to the computer system 12 over network(s) 16. The interface 14 may further enable the computer system 12 to connect one of communication device 15a for text messaging with another of communication devices 15b or with communication device 17b, where both connected devices have text messaging capability.

Computer system 21 represents a microprocessor-based system or device capable of communication with computer system 12, via interface 14, by calling such one or more phone numbers assigned to system 10. Computer systems 17a and 21 each are programmed to enable a user, via the user interface (e.g., touch screen, keyboard, mouse, or the like) of such systems, to enable a graphical user interface (GUI) to send a request to computer system 12 to establish a two or more multi-party call in which one or more participant are conversant in different languages. For example, computer systems 17a or 21 may be personal computer, laptop, PDA, or cellular phone having a GUI for enabling the computer system 17a or 21, as will be described later. Computer system 10 although illustrated as single block in FIG. 1 may represent one or more computer systems or servers.

The computer system 12 is connected to memory 20 which may be an external memory unit, or an internal memory (RAM) or drive of the computer system, or combination thereof storing the programming for operating the system and at least an Interpreter Database associating interpreters with language pairs for which the interpreters can interpret and with identification information, for example the phone number of the interpreter, as described below in connection with the example database shown.

Communication devices 15 preferably are cellular or wireless based communication devices, such as mobile cellular telephones, PDAs, or personal computers, laptops, or other microprocessor based systems capable of communication with computer system 12. The connection to interface 14 from devices 15 or system 21 may further include in additional to use of a cellular based communication may utilize a Public Switch Telephone Network (PSTN) in their connection to interface 14. In the case of a multi-party call, one or more of the communication devices 15 may optionally be a typical non-cellular land communication device, e.g., telephone, or a microphone and a headset. In addition to computer system 12 having typical software for enabling server operation, computer system 12 further has software for determining (or requesting) a geographic location of any one of the communication devices 15 which are GPS enabled (i.e., have hardware/software for using the Global Positioning System (GPS) by GPS signals to detect device location), or by triangulation to determine location of the devices 15. Such software at computer system 12 may be similar to that conventionally used to locate the geographic location or region of a cellular based phone or wireless mobile system, and is not limited to GPS or triangulation methods.

The Interpreter Database consists of a list of interpreters/agents who are available to work in each language. This database is continually updated based on work schedules of the interpreters, so that only those who are presently on duty are indicated as available in the database. An example of the Interpreter Database is shown below:

whether the interpreter is on duty and, if so, available as connections are enabled and disabled by the computer system 12 with members' communication devices. Other data structures than those shown in the above example Interpreter Database may also be used having the same or similar information.

The interpreter may be residing at another computer system or terminal which can communicate with computer system 12, such as via network 16 to enable communication between the computer system 12 and a computer terminal at which the interpreter sits, such as via network 16 to the interpreter's computer system. Such communication between the computer system 12 and the computer terminal at the location of the interpreter may be for assisting the interpreter during the call and to help us collect information about the call. Further the interpreter may be, for example, an agent or other personnel for a company providing the conference call service.

Multiple participants, three or more, may connect to computer system 12 via interface 14 or via network 16. Each participant is located at one of communication devices 15 or 17. Communication devices 17 used by network participants are labeled $PN_1$ to $PN_N$, where N is the number of participants Example Interpreter Database
Date and Time: Oct. 24, 2009, 12:34:58 pm

| interpreter ID | Language 1 | Language 2 | Consecutive | Simultaneous | On duty? | Available? |
|---|---|---|---|---|---|---|
| xxx abc | English | Spanish | yes | no | Yes | no |
| xyx abc | English | French | yes | no | No | — |
| xyy efg | English | German | yes | yes | Yes | yes |
| xxy mnt | English | Mandarin | yes | yes | No | — |
| yxx gfd | English | Japanese | yes | no | Yes | yes |
| yxy pre | French | Cantonese | yes | yes | Yes | no |
| yxy bcx | French | Dutch | yes | yes | Yes | yes |
| yyx zsa | French | Japanese | no | yes | No | — |
| yyy ert | French | Punjabi | yes | no | Yes | yes |
| xxx bvq | German | Hindi | yes | no | Yes | no |
| xxx jky | German | Japanese | no | yes | Yes | yes |

"Interpreter ID" is the identification of an ID code or name of the interpreter. "Language 1" is one of the languages in a language pair from which or into which the interpreter can interpret. "Language 2" is the other language in a language pair from which or into which the interpreter can interpret. If a an interpreter can interpret between more than two language pairs, the interpreter may have additional entries under the same interpreter ID for each of such language pairs. "Consecutive" is a yes or no (e.g., flag or field), where if set to "yes" means that the interpreter is capable of providing consecutive interpretation for that language pair, and is otherwise set to "no". "Simultaneous" is a yes or no (e.g., flag or field), where if set to "yes" means that the interpreter is capable of providing simultaneous interpretation for that language pair, and is otherwise set to "no". "On duty?" is a yes or no (e.g., flag or field), where if set to "yes" means that the interpreter is on duty at the moment identified by the "Date and Time", and if otherwise set to "no". "Available?" is a field that can be set to "yes", "no", or "—"; where, "yes" means that the interpreter is on duty at the moment, and not on another call or scheduled for another pre-scheduled call; "no" means that the interpreter is on duty at the moment, but is waiting for another call or scheduled to begin another prescheduled call; and "—" means that the interpreter is not on duty. The Interpreter Database is updated by the computer system 12 automatically in real-time indicating the status of the interpreters as to using network 16. Communication devices 15 represent phone (cellular or land) participants are labeled $P_1$ to $P_M$, where M is the number of phone based participants. The total number of participants in a conference call either by telephony or by the network is thus N plus M. The computer system 12 enables a user, called herein an Organizer, to arrange a conference or conference call with remote interpretation among all participants designating which participants speak (are conversant) in a Main Language, and other(s) who speak (are conversant) in non-Main Language(s) with use of the simultaneous interpretation. The Main Language represents the primary language of the conversation as established by the Organizer. Participants speaking the Main Language do not use interpreters for the conversation. Each of the participants speaking a non-Main Language is selected by the computer system 12 using the Interpreter Database for an interpreter having a two language pair representing the participant's non-Main Language and the Main Language, has "Available?" set to "yes". Preferably the interpreter selected has "Simultaneous" set to "yes" in the Interpreter Database. However, the Organizer may select rather than simultaneous interpretation to have consecutive interpretation, whereby the participant and his/her interpreter speak in turns rather than at the same time by appropriate selection of an interpreter in the Interpreter Database for the desired language pair with the "Simultaneous" set to "no" and "Consecutive" set to "yes". If two of more participants speak the same non-Main Language, they may use the same interpreter for such non-Main Language. A non-Main Language participant may understand and/or speak the Main Language, but he or she prefers, for this conversation, to either only speak through an interpreter or both speak and listen through an interpreter. The interpreters at one or more of communication device 15b and 17b are connected into the conference call by the computer system 12 as described below. Although only two interpreters are shown there may be multiple interpreters at multiple ones of communication device 15b and 17b in system 10 for the different language pairs, and some interpreters provide the same language pairs. Alternatively, the Organizer may arrange remote interpretation to assist attendees at a conference. The requesting communication device 15a may represent one of the multiple participants in a multi-party call when calling into computer system 12 to be connected via a selected interpreter for interpreting between the Main Language, and the preferred language of such participant.

In the alternative to computer system 12 automatically selecting for each of the participants speaking a non-Main Language an interpreter from Interpreter Database having a two language pair representing the participant's non-Main Language and the Main Language, has "Available?" set to "yes", the selection may instead be carried out manually by a conference administrator from the Interpreter Database (or similar list) before the start date and time of the conference.

Participants are first contacted as to the date and time scheduled by the Organizer for the call to take place, and then call in prior to such time. Those participants designated as speaking the Main Language (identified as $P_1ML, P_2ML, \ldots$ or $P_xML$) are connected by their associated communication devices 15 or 17 to provide two-way communication with each other in a Main Language Circle ("MLC"), i.e., the link of constant connection of phone lines, other voice lines or other audio communication links for Main Language conversations to take place. It is a voice circuit on which all speech created and heard is in Main Language, and represents the base for the telephone call conversation.

As each Main Language participant calls in to the computer system 12 via their respective communication device 15 or 17 they are connected in the Main Language Circle by the computer system 12. As each non-Main Language participant calls in to the computer system 12 via their respective communication device 15 or 17 they are primarily connected to the conference call or conference via an interpreter who is connected to the Main Language Circle. Each participant designated as being a non-Main Language participant (identified as $P_aL_b$ where $P_a$ represents the number of the individual participant and $L_b$ represents the language said participants speaks) calls in with their respective communication device 15 or 17 to computer system 12 and is provided an available interpreter by the computer system 12 (such interpreter is designated as $L_1I, L_2I, \ldots L_bI$, where the subscript numeral matches the language of the corresponding non-Main Language participant), and the interpreter is added to the Main Language Circle, and the non-Main Language participant is connected for a two-way conversation with the interpreter. The connection from the participant to the interpreter may be through the handset of a phone or a headphone worn or used by the interpreter. Thus, the voice communication from the participant is not directly transmitted to the MLC in the default settings. Such a system of voice lines connecting interpreters to the Main Language Circle, but not the non-Main Language participants, directly allow for simultaneous interpretation to some participants without the distracting voice of a non-Main Language participant. This is achieved by providing each non-Main Language participant with only an incoming connection from the Main Language Circle unless, in some circumstances, non-Main Language participant decides directly enter the Main Language Circle and bypass interpretation. The non-Main Language participant has both an outgoing and incoming connection to his interpreter either by a single or multiple lines. The interpreter has both an outgoing and incoming connection to the Main Language Circle. The connections from the Main Language Circle to the interpreter and from the non-Main Language participant to the interpreter are always open, because the interpreter must be able to hear what is happening. If non-Main Language participant chooses to listen to the Main Language Circle instead of his interpreter, then the call begins with an open line from the Main Language Circle to non-Main Language participant. If non-Main Language participant chooses to listen to interpreter instead of the Main Language Circle, then the call begins with an open line from interpreter to non-Main Language participant and a severely lowered volume on the line from Main Language Circle to the non-Main Language participant. When the computer system 12 recognizes sound on a connection (or line) from a non-Main Language participant to the interpreter (through voice activation or other means) the connection from the interpreter to the Main Language Circle is opened so that the interpreter can speak on behalf of his respective non-Main Language participant of his or her respective participant, and the line remains open for a short time after the participant finishes speaking. Also, when the non-Main Language participant presses a button requesting to speak, the line from the interpreter to MLC is open so that the interpreter can interpret what the participant says.

Figure 2:
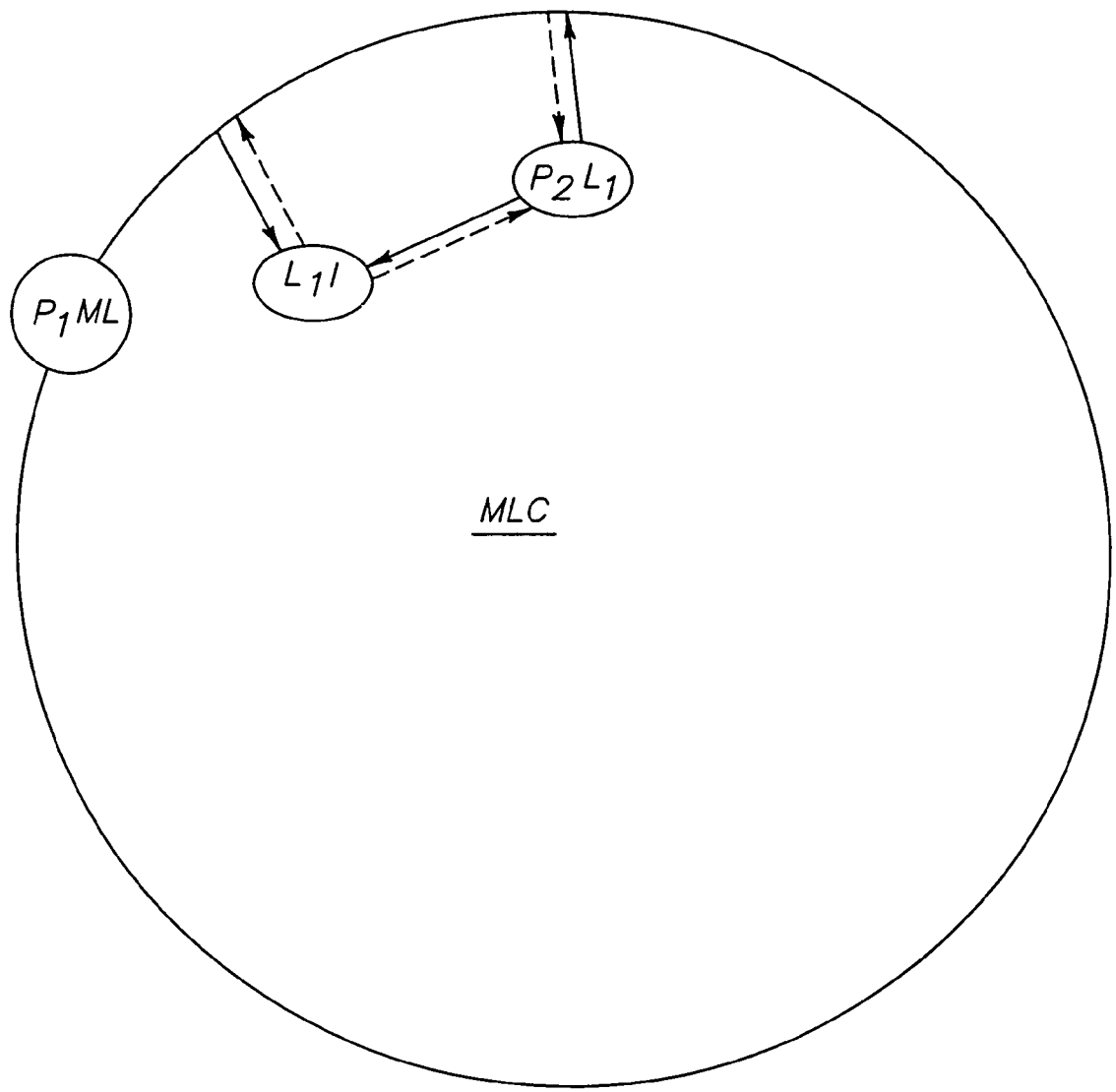
FIGS. 2, 3, and 4 are three schematic examples of diagrams showing the connections between multiple participants to a conference call and one or more interpreters.
Figure 3:
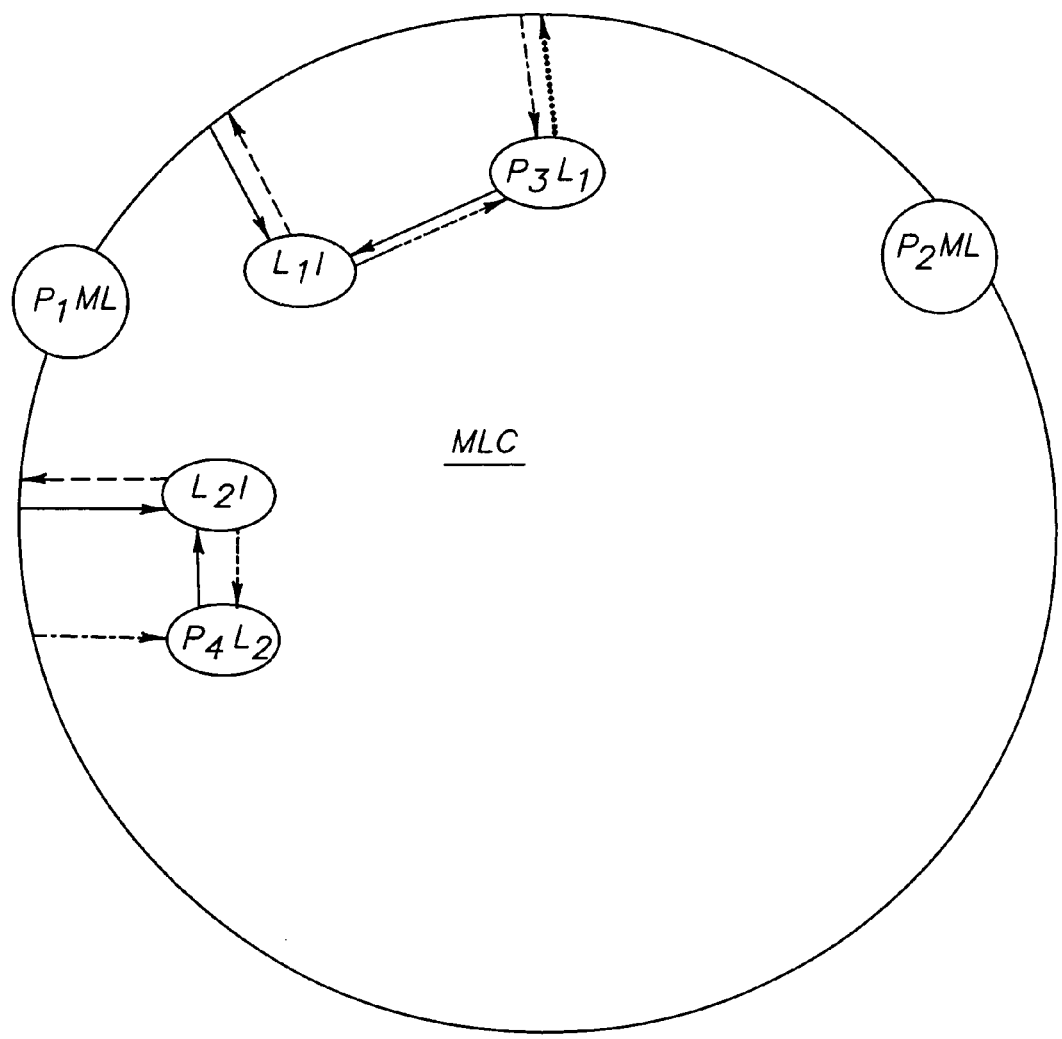
Figure 4:
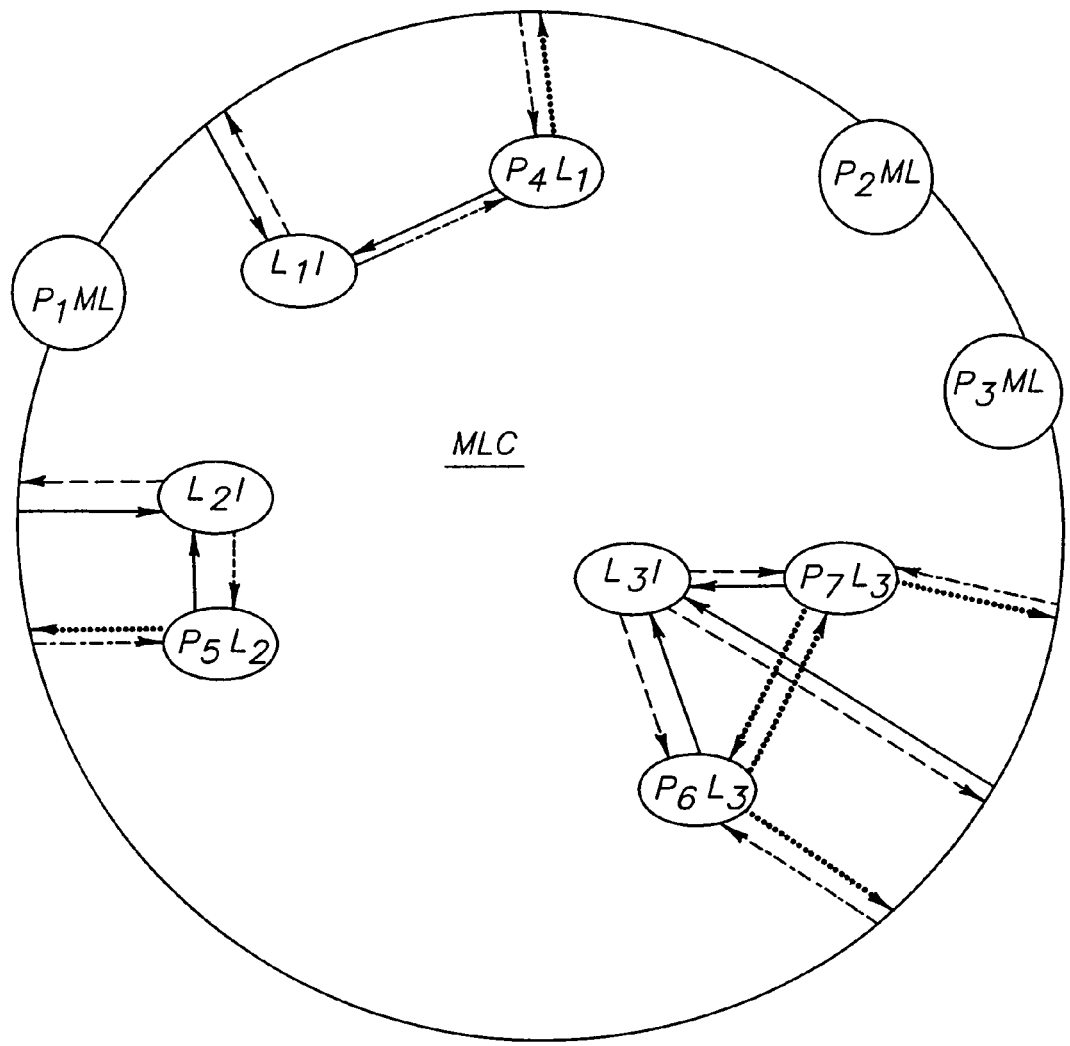

FIGS. 2-4 show examples of conference call connections or conference connections when remote interpretation is used. In these examples, solid line arrows represent a one-way connection to the MLC in the direction of such arrow. Dashed line arrows represent a one-way connection which is open only when the computer system 12 detects speech, and for a short time thereafter $P_2L_1$ finishes speaking, or chooses the option keep the line open for communication. Dotted line arrows represent a connection by non-Main Language participant which when active allows that participant to speak directly to the MLC, but is normally not active. Alternating dash and dot line arrows represent connection that is volume controlled by the non-Main Language participant, which normally is severely muted. In the example of FIG. 2, there is shown a Main Language Circle (MLC) with one Main Language-speaking participant ($P_1ML$, $P_jML$ designates a participant speaking in the main language and not using an interpreter), one non-Main Language participant ($P_2L_1$), and one interpreter ($L_1I$) for that non-Main Language participant. In the example of FIG. 3, there is shown a MLC with two participants ($P_1ML$ and $P_2ML$) who speak the main language, two non-Main Language participants ($P_3L_1$ and $P_4L_2$) who speak Language 1 and Language 2, respectively, and one interpreter ($L_1I$) for $P_3L_1$ and another interpreter ($L_2I$) for $P_4L_2$.

When there are two or more participants speaking the same language, one interpreter may assist more than one of these participants. In that case, the pre-call settings will determine if each participant listens primarily to others speaking the same language or to the interpretation of their speech. An example of this is in FIG. 4 which shows a MLC with three Main Language-speaking participants ($P_1ML$, $P_2ML$, and $P_3ML$), four non-Main Language participants speaking three different languages ($P_4L_1$, $P_5L_2$, $P_6L_3$, and $P_7L_3$), and three interpreters for the three languages ($L_1$, $L_2$, $L_3$) denoted by $L_1I$ for participant $P_4L_1$, $L_2I$ for participant $P_5L_2$, and $L_3I$ for participants $P_6L_3$ and $P_7L_3$. Unlike the first two examples, the example of FIG. 4 there is a group of two non-Main Language participants who speak the same non-Main Language ($L_3$). The non-Main Language participants $P_6L_3$, and $P_7L_3$ may make pre-call settings to determine if they prefer to listen to each other speak or listen to the interpretation of what each other said. $P_6L_3$, and $P_7L_3$ can only choose to listen to each other if they already chose to listen to their interpreter instead of directly to the MLC. One interpreter thus assists two non-Main Language participants who speak the same language. The number of non-Main Language participants assigned to the same interpreter may be limited if needed according the language or the interpreter's capability. The computer system 12 has hardware and software for enabling the switching and bridging as described in these examples, and to switch on/off connections to provide one-way or two way connections between interpreters and participants, with adjustment of volume, as described above. Further operators 22 may be connected via their communication devices to the MLC or with individual participants via either interface 14 or via network 16, if a problem occurs during the conference, i.e., such as a lost connection to a participant, audio difficulties, or the like.

The communication device 15 or 17 of each participant may have a display through which the computer system 12 can provide information during the conference call, called herein a Visual Display. Where the participant uses a communication device 17, device 17 may be part of a computer system having a browser for enabling the participant to connect via network 16 to computer system 12, such as for enabling one or more of: providing notification of the conference call (e.g., e-mail), calling-in to a network address of the web site associated with the conference to be established by the computer system 12, or receiving information about the conference via a Visual Display. Such Visual Display may represent web page(s) downloaded from the computer system, or other on screen indicators.

The Visual Display is preferably a computer program or downloaded web page(s) from the computer system 12 which are updated by the computer system with conference information. The Visual Display identifies speaking participants (via highlighted, flashing, or other notification related to displayed text, graphics, or photos of participants), and/or has selectable buttons, field, or other graphics, to send input to the computer system to effect the participant connections (e.g., volume control, opening two-way commutation to MLC) that allows for manipulation of the settings of various lines of the given participant. If the display is a website page, the website page will be tailored specifically for that call, showing the name of each Participant placed in its own graphic around one large circle. When a Participant is speaking, the graphic demarking that Participant may be highlighted and enlarged. The web page may contain other features for assistance and adjusting settings. Other variations of visuals may display the current speaker and also provide functions that allow for adjustments of the settings, and are not limited to those described herein. Although a participant may use communication device 15, such communication device may not be able to receive web pages providing the Visual Display, as such the participant with communication device 15 may utilize a computer system, such as computer system 17a at his or her location to log-in and obtain a Visual Display, but where voice communication is via their communicating device 15. The Visual Display may feature an assistance button that any participant can press to immediately notify all Participants and interpreters that a Participant is having a problem and the conversation must be delayed. When the assistance button is pressed, an employee of the system operator or an employee of a contractor or licensee may join the conversation to assist, with interpreters providing the necessary interpretation.

The visual display may include controls for adjusting the volume coming from the MLC and (for a non-Main Language participant) coming from the interpreter and others speaking the same non-Main Language. All of these can be fully muted as well, at the Participant's discretion, at any point in the call.

Another feature of the Visual Display an option to notify others that the participant chooses to speak. It is not required, but can be useful, especially for non-Main Language participants who may otherwise be cut off. In any case, the line from the interpreter to the MLC opens automatically upon voice activation once the non-Main Language participant begins speaking and stays open for a short time after the non-Main Language participant stops speaking to allow the interpreter to speak to the MLC.

As an additional option on the Visual Display, a non-Main Language participant may be able to override the interpretation system and speak directly to MLC by utilizing an override option on the Visual Display. The Visual Display may also provide a button for logging out of the conversation. It may provide other information or features as well.

Alternatively, or in additional to the Visual Display provided on the screen of communication device 17 having web access to computer system 12, an optional external Visual Display unit 18 may be used which at least identifies the speaking participant in the conference in a manner similar to the Visual Display just described above. This external Visual Display unit 18 may be an LCD display, CRT display, or projector onto a surface, connected to computer system 17a, to computer system 12, or to network(s) 16 to receive output graphical screen or window generated by computer system 12. For example, external Visual Display unit 18 may be in a common room with one or more of the participants, and a conference may have one or more external Visual Displays. The external Visual Display unit may also be a unit associated with a given participant having light emitting diode(s) ("LED") or array or LEDs, or screen, or other electronically manipulated visual that identifies speaking participants and/or allows for manipulation of settings of various lines of the given participant. For example, different LED or Array may be associated with each different speaker and be provided to a participant of the conference. The computer system sends graphics to the unit's screen or actuates LEDs thereof as speakers change, and knob(s) or button(s) may be provided on the unit to control volume or connections at his or her respective communication device 15 or 17 with the Interpreter and/or MLC.

Figure 5:
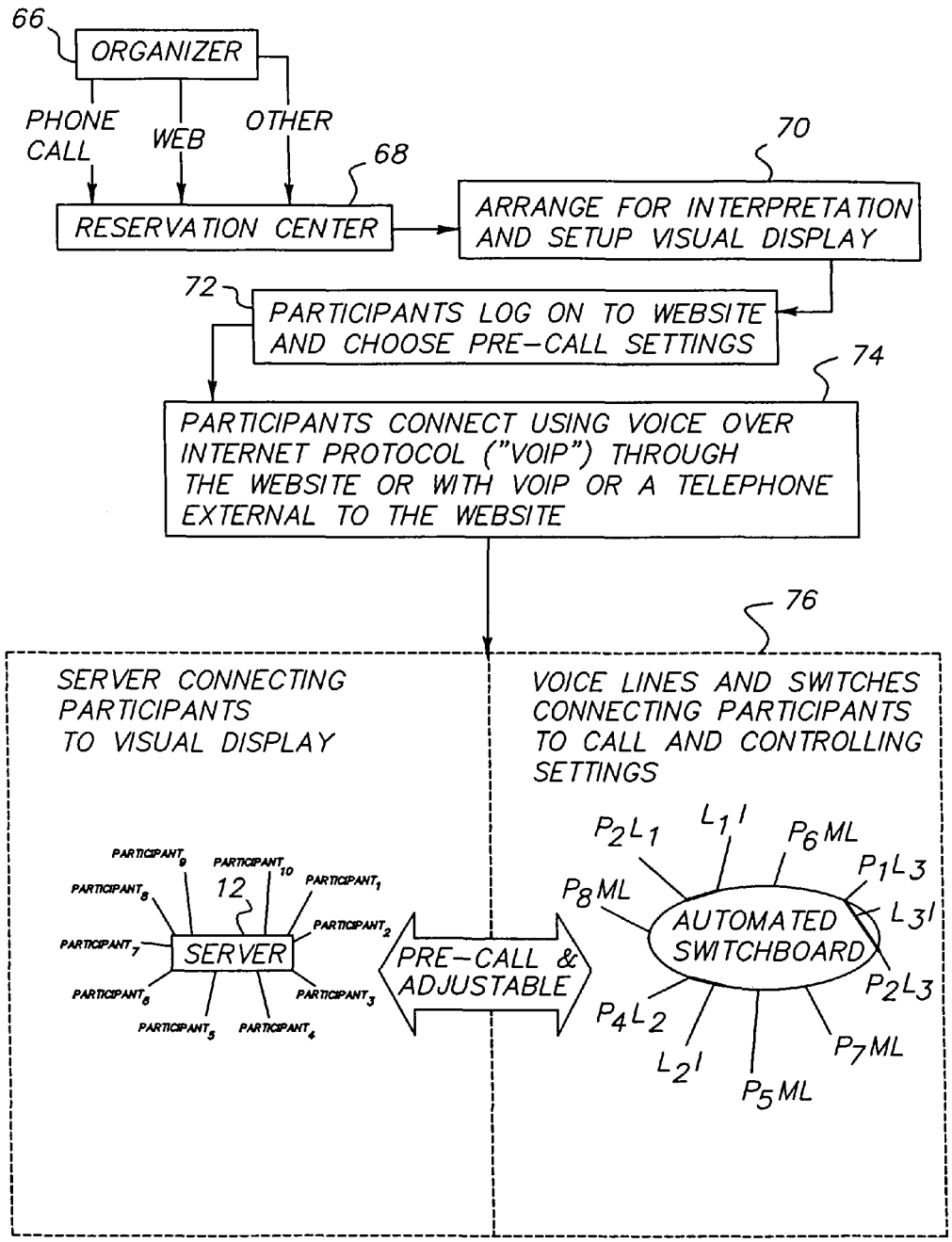
FIG. 5 is a process diagram of the organizing of a conference call in the system of FIG. 1.

Referring to FIG. 5, the operation of the system for conferencing having participants with two or more different languages and one or more interpreters is shown. First, Organizer 66 make a reservation in system 10 at a reservation center 68, i.e., address of a web site, or assigned phone number of automatic or human operator. The Organizer 66 prearranges the conversation, either by calling to make reservations, or completing an on-line form at a web site for system 10. At that time, the Organizer also chooses the Main Language of the conference, provides the number of participants and which participants speak which language. Although preferably interpretation type is simultaneous for non-Main Language participants, the Organizer may optionally select for a non-Main Language participant to provide for simultaneous or consecutive interpretation. The Organizer pays for the service or arranges for future payment. In one example, the Organizer is located at computer system 17a having a browser. The Organizer enters an address associated with a web site of system 10 at computer system 12 to connect computer system 17a via network 16, such as the Internet, to computer system 12. In response, computer system 12 sends one or more web pages to computer system 17a having fields to enter conference information in a conference request form. Conference information in addition to designated main language and the number of participants, name of organizer, and payment (billing) information, or other information (e.g., interpretation type), but also for each participant one or more identifying information, such as e-mail address, name, phone number, or a pass-code. In another example, the Organizer uses a phone (cellular or land phone) contacts the computer system 12 at a phone number assigned to system 10, via interface 14, and is led through automated prompts via phone keys (or voice) to enter the conference information. In a further example, a human operator at a computer system 17a is connected to an Organizer calls the system 10 on a phone, and the operator enter the information in web pages rather than the Organizer.

Once reservations are complete, the computer system 12 provides the Organizer information (such as via an acknowledging web page at computer system 17, or by automated voice via phone) to forward to (or otherwise inform) the participants with instructions as to how to connect to the arranged conversation, or the Organizer provides contact information (e.g., e-mail address) for each participant so that computer system 12 via automatic voice call and/or human operator can instruct participants in connecting to the call. The entire process may be automated. The Organizer may or may not be one of the participants.

At step 70, prior to the scheduled time and date of the call, such as 5 to 10 minutes before, the computer system 12 selected the interpreters using the Interpreter Database for the language pairs between each non-Main Language and Main Language needed for a scheduled conference call. The Interpreter Database is updated by the computer system 12 automatically updates in real-time the status of the interpreters. This is accomplished by adjusting the Interpreter Database for the future, so that, by example, when there is a scheduled multi-party conference requiring remote interpretation in at 5:00 pm Eastern Standard Time, and the on duty interpreters for that time are known by 8:00 am Eastern Standard Time, the system can automatically reserve the appropriate interpreters in advance, scheduling the interpreters to begin a few minutes early so that it is assured they will be available at the start of the call. This is done by taking a snap shot of the Interpreter Database as it will be at 5:00 pm, or perhaps 4:45 pm, to be assured the interpreters will be available at 5:00 pm, and then changing the "Available?" for that time to "no" and marking that the system will connect that interpreter to specified participant(s) at that time. Also at step 70, the computer system 12 also sets-up the in-call web page for the Visual Display graphics, as described earlier, to be sent to those participants whose communication device can receive such Visual Display after they log-in for the conference call.

As stated earlier, the interpreters are preferably automatically selected by computer system 12, however step 70 may instead be carried out manually by a conference administrator from the Interpreter Database (or similar list) before the start date and time of the conference. Updates of the Database described herein are preferably automatic, but may also be performed manually at the computer system 12. The interpreter selected for each language pair between each non-Main Language and Main Language may be contacted automatically (or manually by the conference administrator), such as by e-mail or text message, in advance of the conference start time.

The participants each call into the computer system, via interface 14, or sign-in (or log on) to a web page provided by the computer system via network 16, prior to the time of schedules conference time (step 72). For example, the web page(s) provided by computer system 12 to the computer system of participants at the sign-in (or log on) may be available in multiple languages approximately five to ten minutes before the scheduled conference call and provides identifying information (either an email address, a name, a phone number or a pass-code) to the computer system 12 who the participant is, which call the participant will be connecting to, whether that participant needs interpretation, and, if so, in what language. Although the Organizer at the time of submitting the request for the conference call identifies the different languages of each of the participants and which of the different languages will be the main language of the conference call, each participant at the time of sign-on (or log in) confirms or can change their preferred language or regional variation thereof. Alternatively, each participant may be given a specific phone number to call which is assigned to the language for the participant. Also, the main language of the conference call to be established may be automatically selected by the computer system 12 to one different from the one selected by the Organizer to such language selected by a majority of the calling in participants prior to the start of the conference call. Each of the participants may be considered as one of a plurality of requesting communication devices for a particular conference call.

The term participant represents an individual or a group of individuals which may be present at the same location, such as a room, conversant in the same language. As such, when the participant represents a group the communication device may have a speakerphone to enable communication, as described above in the conference call, with any one of the individuals of the group, or other audio electronic means having microphone(s) or speaker(s) for enabling communication via a communication device, or one or more individuals may have phones or headsets coupled for communication with the same communication device.

In the event a Visual Display is used and the participant connected to the computer system 12 is a sign-in or log-in page, in-call web page for the Visual Display graphics is generated as described earlier denoting the participants in the conference call. If the participant is a Main Language participant, the computer system 12 connects the participant to the in-call web page to wait for the start of the call. Voice communication will be through the computer system being used by the participant, such as via VoIP, which has hardware (speaker or microphone) and software to enable such communication. Optionally, where the participant calls in from a phone 15 via interface 14, the participant is instructed to wait for the conference to begin.

If the participant is a non-Main Language participant, the computer system 12 prompts the participant to establish settings for the call and requests the participant via web page (or voice prompts):

1) If he/she would a) like to hear interpretation of each participant conversing the in the Main Language or b) he/she is capable and would prefer to listen to such participants himself/herself.
   If the answer to (1) is (a) and if there is at least one other participant speaking the same language, then the participant is asked question (2) below.
2) If he/she would like to listen directly to others who speak his/her language when they speak or if he/she prefers to hear the interpretation heard by the rest of the participants? (This question assumes there are multiple Participants speaking the same language other than the Main Language). The default setting if there are two more non-Main Language participants speaking is to provide a connection between them that enables them to hear each other, rather than through their interpreter to the Main Language Circle.

After the settings for the non-Main Language participants are entered, the computer system 12 sends the non-Main Language participant the Visual Display (if there is one) to await the start of the call.

Once the computer system 12 identifies the participants and obtains information as to the pre-call settings for non-Main Language participants described above (step 72), the computer system 12 connects each of the participants, such as described earlier in the example of FIGS. 2-4, for phone or VoIP communication depending on the type of communication device 15 or 17 used by respective participants (step 74). This involves computer system 12 connecting the Main Language participants respective communication device 15 or 17 in the Main Language Circle, and each non-Main Language participant via their respective communication device 15 or 17 to the Main Language Circle via a selected interpreter for pair of the participant's non-Main Language and the Main Language who is available, and has desired Simultaneous or Consecutive setting (step 76). The Visual Display of the communication device 15 or 17, or external Visual Display unit 18 facilitates the participant to identify who is speaking directly or through an Interpreter. When a participant represents a group, the Visual Display or external Visual Display unit 18 may use an identifier associated with the group or their location/room.

As each non-Main Language participant is disconnected from their associated interpreter, and the interpreter has no other connected non-Main Language participant, the Interpreter Database is updated. Once an interpreter is no longer connected to the conference, the "Available?" for that interpreter in the Interpreter Database is switched to "yes."

The preferred embodiment of interpretation for such conference conversations is the one described above. The following variations may be provided in system 10 for conference calls or conferences for which remote interpretation is used:

1) The interpreter may control who is able to hear the interpreter's outgoing speech by toggling between an open line to the conversation or an open line to the non-Main Language participant. A switch provided as a hardware attachment to the audio lines at the interpreter's communication device, which can be controlled by the interpreter by pressing keys on the communication device, or an external manual switch. This may or may not completely shut off the line through which the interpreter wishes to speak at that moment.

2) The interpreter uses two separate audio lines. In the case of using telephone lines, the interpreter could simply use two phones and speak into only one at a time, or the interpreter could switch back and forth between phone lines with a switch on a two-line system. While the interpreter is speaking in one direction, the interpreter may or may not have the ability and choose to listen to the other voice(s) coming from the other direction. The line from the interpreter to the non-Main Language participant may be unidirectional.

3) The interpreter and non-Main Language participant both connect to the conversation (i.e., the main conference circle), but they also connect to each other with a separate, bidirectional line, and they use that separate line to communicate amongst themselves. In that situation they can switch between lines with a switch on a two-line system or simply speak into the correct microphones or telephones while covering the others or holding them Furthermore, in situations such as a conference in which interpreter is providing remote interpretation of proceedings or in a conference call in which non-Main Language participant is simply listening to the conversation and is not and will not be speaking in the conversation, the system can be established with a unidirectional line from the conversation to the interpreter and a (unidirectional or controlled bidirectional) line between the interpreter and non-Main Language participant.

Where there are two participants conversant in two different languages, and said selected interpreter is selected by said computer system using said second database to interpret between the Main Language and the non-Main Language, as such the computer system 12 may connect communication devices two participants with the selected interpreter in a three-way call with typical two-way connection between all participants or with such connections and volume control of the FIG. 2 example. In this scenario, a simple three-way call, with or without volume and directional controls, is employed.

As described above, a requesting party provides a request to system 10 to connect with one or more other participants in a multi-party (conference) call in which the participants are conversant in two or more different languages and require thus one or more interpreters to be connected into the conference call. System 10 provides simultaneous language interpretation over telephone or voice lines or other audio communication link in conjunction with or without a Visual Display either on computer, light-emitting diodes or other electronically manipulated visual. The system works for conference calls and other electronically transmitted conversations of varying sizes and numbers of languages. This system provides uninterrupted conversation to each participant without the burden of hearing two speakers (i.e., a participant and an interpreter) speaking at once, opening and closing selected connections and/or adjusting the volume of sound on selected connections according to pre-selected settings and adjustments selected by the participants and depending on who is speaking at the moment. The simultaneous interpretation allows conversation to flow smoothly and proceed efficiently.

Optionally, written material may be translated between any two different languages of a conference for participants as needed during the conference (real-time), or provided before the start of the conference. Such written material may be automatically translated by the computer system 12 having software for enabling such automatic translation, or the written material may be provided to the selected interpreter (or to another interpreter available in Interpreter Database) for two different languages for interpretation. The written material may be transmitted via the Internet to a web address associated with the computer system 12 having a graphical user interface (GUI) attach and sent a digital copy of the written material to be translated, such written material is usually in one of the languages of an identified conference into other languages of the conference (but may be in another language that is not one of the those of any selected translator of the conference), or to setup an on-line link (such as via the Internet or LAN) to a source of written material, as described later. Such GUI may be part of the same GUI used by a user is enable to request to computer system 12 to establish a two or more multi-party call in which one or more participant are conversant in different languages, or a different GUI.

For each language other than the language of the written material, computer system 12 transmits the material to the communication device (or associated computer system) of the selected translator for viewing and translation. A GUI may be provided at the communication device (or associated computer system) of the translator for enabling viewing written material and sending translated material back to the computer system 12 (or to the communication device of participant(s) who can read such translated written material). Such translated written material may then be either sent by the computer system 12 (or the translator's communication device) to the participants in each of their particular languages via either via the Visual Display of their respective communication devices 15 or 17 or via an external Visual Display, and/or sent to a printer for printing when the communication device 15 or 17 is coupled to a printer for enabling printing of the translated written material. Similarly, but without translation, each participant capable of reading the language of the written material views such material using the either via the Visual Display of their respective communication devices 15 or 17 or via an external Visual Display, and/or sent to a printer for printing when the communication device is coupled to a printer for enabling printing. Automatic translation may be performed by the computer system 12 either by selection of automated translation option by the submitter of such written material to the computer system 12 (or if the selected Interpreter upon receipt of the written material sends a message back to the computer system 12 than such cannot be provided simultaneously with oral translation). Alternatively, the translated written material may be orally presented by selected interpreter (or another interpreter), or by computer system 12 or participant's communication device (via synthetic speech) for a participant. Such may be especially useful when the translated written material cannot be displayed and/or printed.

The written material may be a digitally document file, or if needed, a scanned file of a scanned/facsimile generated hardcopy, text message, or via a link by the computer system (as set up by the submitter) to on-line chat room (e.g., instant messaging), message board, conference voting, or notes, that were not provided prior to the start of the conference. The computer system may monitor such one or more sources and sent text detected to interpreter or to the automatic translation software. Optionally, an interpreter may monitor such sources of text to be translated at their communication device or computer system. Text messaging may be used in some instances within the larger conference, perhaps as a means to communicate to only a select group (for example, conference leadership to interpreters) or to communicate messages from conference leadership to all attendees. The written material may thus be presented in real-time to the conference participants, or provided before the start of the conference such that all participant have the written material or translated version thereof when the conference start.

In addition to a selected interpreter providing oral translation for participant(s) in their language, such participant(s) may request their interpreter to translate during a conference verbal, spoken communication into written form which then may be sent from communication device or computer system of the interpreter to the Visual Display of the participant's communication device, or an external Visual Display. The computer system 12 may instead provide this function by having software enabling translation of oral verbal speech into written form.

In summary, system 10 in a preferred embodiment has at least the Interpreter Database, and a computer server(s) 12 with memory space for the database and operations, an automated switching panel and necessary equipment to switch on/off the voices and adjust the volume of participants and interpreters when necessary in the multi-party, conference scenarios and to connect members with interpreters in all situations; lines and other equipment for connecting the voice and data transmissions to and from the server and switches; a computer server and website for the web-based operations which may be the same or separate from computer server 12; Visual Display which may be web-based or light-emitting diodes or colored lights of an external Visual Display 18 indicating which participants are speaking in the multi-party, conference scenarios; assistance agents 22 seated at computers to help when the assistance button is used in the multi-party, conference scenarios; interpreters 15b or 17b with voice lines, these interpreters may be in a virtual call-center, meaning they can be located anywhere and separately as long as they are each available by voice line (including by telephone, by voice over internet protocol or "VOIP" or by other voice transmission system) at the scheduled time; voice lines for the assistance agents and interpreters 15b or 17b, this may include telephone, VOIP or other voice transmission system; and VOIP, if implemented in the system 10.

From the foregoing description, it will be apparent that an improved system, method, apparatus, and software operative on computer system 12, for establishing a conference call in two or more different languages. Variations and modifications in the herein described system and method will undoubtedly become apparent to those skilled in the art. According the foregoing description should be taken as illustrative and not in a limiting sense.

The invention claimed is:

1. A method for establishing with a computer system an audio conference between two or more communication devices each associated with one of a plurality of different languages, wherein one of said different languages represents a main language, said method comprising the steps of:

providing a computer system connecting each of one or more of said communication devices associated with a different one of said languages than said main language with a communication device of an interpreter for interpreting between said different one of said languages and said main language to enable the communication device of the interpreter to receive voice communication from each of the one or more of said communication devices associated with said different one of said languages, and connecting the communication device of the interpreter associated with each one of said different languages than said main language with one or more of said communication devices in the main language to enable the communication device of the interpreter to receive voice communication from said one or more communication devices associated with the main language; and controlling the communication device of the interpreter associated with each one of said different languages than the main language during oral translation by the interpreter between said one of said different languages and said main language as to which one of (i) one or more of said communication devices associated with the main language is connected to the communication device of the interpreter, or (ii) one or more of said communication devices associated with said one of said different languages is connected to the communication device of the interpreter, to receive voice communication of the interpreter in one of said main language or said one of said different languages, respectively, in which said controlling step is carried out by said computer system responsive to the interpreter at the communication device of the interpreter for at least one of the one or more different languages than the main language over a single voice communication line between the communication device of the interpreter and said computer system.

2. The method according to claim 1 further comprising the step of:
connecting two or more of said communication devices by said computer system in an audio conference bridge when said two or more of said communication devices are associated with said main language.

3. The method according to claim 2 wherein said controlling step further comprises connecting by said computer system the communication device of the interpreter for each one of said difference languages than said main language to said audio conference bridge.

4. The method according to claim 2 further comprising the step of providing by said computer system for at least one of the one or more communication devices associated with one of the different languages than the main language with a one-way receive only connection with the audio conference in said main language to enable hearing the audio conference in said main language.

5. The method according to claim 1 further comprising the step of providing by said computer system for at least one of the one or more said communication devices associated with one of the different languages than the main language with a one-way receive only connection with the audio conference in said main language to enable hearing the audio conference in said main language at an adjustable volume level at the communication device.

6. The method according to claim 1 further comprising the step of selecting for at least one of the one or more said communication devices associated with one of the different languages than the main language between one of a one-way receive only connection and a two-way connection to one of more of said communication devices associated with said main language in which said selected connection is carried out by said computer system.

7. The method according to claim 1 further comprises the step of providing at least one of the communication devices with a display for displaying an identifier associated with each of the one or more other communication devices and from which of the communication device voice is being received.

8. The method according to claim 1 further comprising the step of providing at least one of the one or more said communication devices with an interface to notify other of said communication devices of an intention to speak.

9. The method according to claim 1 wherein each of said communication devices is associated with two or more individuals conversant in the same one of the different languages.

10. The method according to claim 1 wherein each of said communication devices is associated with a room at a location having one or more individuals conversant in the same one of the different languages.

11. The method according to claim 1 wherein each of said communication devices is one or more of a cellular telephone, PDA, land-based telephone, microprocessor-based system, wireless communication device, or headset.

12. The method according to claim 1 further comprising the step of providing interpretation of text between any two different languages into translated text or speech at the start of or during the audio conference to one or more of the communication device.

13. The method according to claim 1 further comprising the step of providing interpretation of speech between any two different languages into translated text to one or more of the communication devices.

14. The method according to claim 1 further comprising the step of connecting two or more of the communication devices when associated with the same one of said different languages than the main language in an audio conference with each other by said computer system.

15. A system for establishing a conference in different languages comprising:
means for receiving a request for establishing a conference between two or more communication devices each associated with one of a plurality of different languages, wherein one of said different languages represents a main language;
means for connecting each of said communication devices associated with one of said different languages other than said main language with a communication device of an interpreter for orally translating between said one of said different languages and said main language;
means for connecting the communication device of the interpreter associated with each one of said different languages other than said main language for communication with one or more of said communication devices associated with said main language; and
means for enabling the interpreter associated with at least one of said different languages other than said main language to provide oral interpretation over a single communication with control of direction of out-going voice communication to one or more communication devices associated with said one of said different languages, or said main language.

16. A non-transitory computer-readable medium encoded with a computer program which when executed by a computer system enables a conference via communication devices associated with participants conversant in different languages comprising:
a main language circle established by the computer system having one or more communication devices associated with one of said different languages in which other of said one or more communication devices associated with one or more other different languages are outside of said main language circle, and when two or more communication devices are present in the main language circle said two or more communication devices are connected by the computer system in an audio conference enabling voice communication of said two or more communication devices with each other;
one or more voice communication connections enabled by the computer system connecting each of the one or more communication devices outside of said main language circle to the main language circle via a communication device of an interpreter for orally interpreting between the different language associated with the communication device outside of said main language circle and the language of said main language circle in which the communication device of the interpreter is enabled to receive through a single communication line both voice communication from one or more communication device in the main language circle and voice communication from the communication device outside of the main language circle; and
wherein said voice communication over said single communication line is enabled by the computer system with control of direction of out-going voice communication from the communication device of the interpreter to between one of said one or more communication devices in the main language circle, and said one or more communication devices outside the main language circle connected to the communication device of the interpreter.

17. The computer-readable medium according to claim 16 wherein at least one of the communication devices outside said main language circle has a one-way receive only connection with said one or more communication devices of said main language circle at an adjustable volume level.

18. The computer-readable medium according to claim 16 wherein at least one of the communication devices associated with one of the different languages than the main language is selectable between one of a one-way receive only connection with said one or more communication devices of said main circle.

19. The computer-readable medium according to claim 16 wherein when two or more of said communication devices outside of said main language circle are associated with the same one of said different languages said two or more of said communication devices outside of the main language circle are connected to the main language circle by the computer system using the communication device of a common interpreter.

20. An apparatus for establishing an audio conference via communication devices associated with participants conversant in different languages comprising:
    means for establishing a main language circle to one or more communication devices all associated with the same one of said different languages;
    means for connecting each of the one or more communication devices associated with a different language other than said main language to a communication device of an interpreter;
    means for connecting in an audio conference said one or more communication devices in the main language circle and the communication device of the interpreter connected to each of the one or more communication devices associated with a different language other than the main language; and
    means for controlling the direction of out-going voice communication by the communication device of the interpreter between one of said one or more communication devices in said main circle and said one or more communication devices associated with a different language than that of the main circle utilizing a single voice communication line between the communication device of the interpreter and the computer system.

21. A system for conferencing in different languages comprising:
    a plurality of first communication devices associated with participants conversant in two or more languages, in which one of said languages is designated as a main language;
    a second communication device associated with an interpreter for each different language other than said main language in which the interpreter represents a person capable of orally translating between the different language and the main language; and
    a computer system enabling communication between different ones of said first communication devices and the second communication device for each one of said different language other than said main language, in which said computer system for each different language other than the main language
(i) connects the second communication device associated with the interpreter for voice communication with one or more first communication devices associated with one or more participants conversant in the different language, connects the second communication device associated with the interpreter for voice communication to the one or more first communication devices associated with one or more participants conversant in the main language, in which the second communication device receives voice communication from the one or more first communication devices associated with one or more participants conversant in the different language and one or more first communication devices associated with one or more participants conversant in the main language,
(ii) enables the second communication device to be operated by the interpreter associated with the second communication device in at least a first communication mode and a second communication mode, in which in said first mode the second communication device is connected by said computer system for outgoing voice communication from the second communication device only to one of the one or more first communication devices associated with participants conversant in the different language, and in a second mode the second communication device is connected by said computer system for outgoing voice communication from the second communication device only to one or more first communication devices associated with one or more participants conversant in the main language, and
    the second communication device associated with at least one of the different languages other than said main language is connected by a single communication line to said computer system and operable between said first and second communication modes said by the interpreter of the second communication device to facilitate oral translation; and
    two or more of said first communication devices are connected by the computer system for communication with each other in an audio conference when said two or more first communication devices are associated with participants conversant in the main language, and when only one of said first communication devices are present, said one of said first communication device is connected to said computer set via a communication line.

22. The system according to claim 21 wherein none of the one or more first communication devices in the main language receives voice communication with one or more of the second communication device in one of the different languages other than said main language.

23. The system according to claim 21 wherein one or more of said second communication devices each represents a phone or computer system.

24. The system according to claim 21 wherein said computer system is a computer server.

25. The system according to claim 21 wherein at least one the communication devices associated with one of the different languages than the main language has one of no connection or a one-way receive only connection with the conference in said main language at a low volume, or variable audible level.

26. The system according to claim 21 wherein said computer system enables two or more of the first communication devices associated with participants conversant in the same language other than said main language to be connected for communication with each other.

27. The system according to claim 21 wherein said second communication device associated with at least one of the different languages other than said main language further comprises means for enabling the interpreter associated with said second communication device to toggle between at least said first mode and said second mode.

28. The system according to claim 21 wherein said second communication device associated with at least one of the different languages other than said main language further comprises one or more of a switch or keys associated with the second communication device communication for enabling the interpreter associated with said second communication device to toggle between at least said first mode and said second mode.

29. The system according to claim 21 wherein at least one of said first communication devices is associated with a room at a location having one or more individuals conversant in the same language.

30. The system according to claim 21 wherein each of said first communication devices is one or more of a cellular telephone, PDA, land-based telephone, a microprocessor-based system, a wireless communication device, or headset.

* * * * *